(12) United States Patent
Connor et al.

(10) Patent No.: US 10,391,973 B2
(45) Date of Patent: Aug. 27, 2019

(54) VEHICLE ACCESS CONTROL SYSTEM AND METHOD

(71) Applicant: Sikorsky Aircraft Corporation, Stratford, CT (US)

(72) Inventors: Michael Aaron Connor, New Haven, CT (US); Grace Valeria Tilton, Concord, NH (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 62 days.

(21) Appl. No.: 15/498,892

(22) Filed: Apr. 27, 2017

(65) Prior Publication Data

US 2017/0313280 A1    Nov. 2, 2017

Related U.S. Application Data

(60) Provisional application No. 62/330,340, filed on May 2, 2016.

(51) Int. Cl.
| | |
|---|---|
| *B60R 25/00* | (2013.01) |
| *B64C 27/00* | (2006.01) |
| *B60R 25/04* | (2013.01) |
| *B60R 25/23* | (2013.01) |
| *B60R 25/25* | (2013.01) |
| *B60R 25/24* | (2013.01) |
| *B64C 27/04* | (2006.01) |

(52) U.S. Cl.
CPC .............. *B60R 25/04* (2013.01); *B60R 25/23* (2013.01); *B60R 25/241* (2013.01); *B60R 25/25* (2013.01); *B64C 27/04* (2013.01); *B60R 2325/302* (2013.01)

(58) Field of Classification Search
CPC ......... B60R 25/00; B60R 25/04; B60R 25/23; B60R 25/241; B60R 25/25; B60R 2325/302; B64C 27/00; B64C 27/04
See application file for complete search history.

(56) References Cited

U.S. PATENT DOCUMENTS

| | | | |
|---|---|---|---|
| 6,563,940 B2 * | 5/2003 | Recce .................... | B60R 25/04 382/120 |
| 7,155,034 B1 | 12/2006 | Recce | |
| 8,992,274 B1 * | 3/2015 | Ward .................... | B63H 21/20 440/1 |

(Continued)

FOREIGN PATENT DOCUMENTS

DE    10148993 B4    12/2008

*Primary Examiner* — Yonel Beaulieu
(74) *Attorney, Agent, or Firm* — Cantor Colburn LLP

(57) ABSTRACT

A vehicle access and control system includes an activation system, a vehicle control system, a communication system provided in the vehicle, a computer system mounted in the vehicle, and a vehicle access control system including a processor, a non-volatile memory, and a set of instructions stored on the non-volatile memory. The set of instructions, when executed by the processor, causing the processor to receive a user specific identification input, access a user profile associated with the user specific identification input, determine, from the user profile, system permissions associated with the user specific identification input, and manage access to one or more of the activation system, vehicle control system, communication system, and the computer system based on the system permissions.

13 Claims, 2 Drawing Sheets

(56) References Cited

U.S. PATENT DOCUMENTS

| | | | |
|---|---|---|---|
| 9,507,026 B2* | 11/2016 | Nichols | G01S 19/10 |
| 9,563,998 B2* | 2/2017 | Hoyos | G07C 9/00563 |
| 9,783,162 B2* | 10/2017 | Hoyos | G07C 9/00563 |
| 2003/0068044 A1 | 4/2003 | Nikolsky | |
| 2008/0266054 A1 | 10/2008 | Crank | |
| 2012/0130563 A1 | 5/2012 | McBain | |
| 2014/0129053 A1* | 5/2014 | Kleve | B60R 25/24 |
| | | | 701/2 |
| 2016/0288905 A1* | 10/2016 | Gong | H04L 63/101 |
| 2016/0321930 A9* | 11/2016 | Yu | G05D 1/0214 |
| 2017/0169713 A1* | 6/2017 | Gong | H04L 63/101 |

* cited by examiner

VEHICLE ACCESS CONTROL SYSTEM AND METHOD

CROSS-REFERENCE TO RELATED APPLICATIONS

The present application claims priority to U.S. Provisional Application No. 62/330,340, filed on May 2, 2016, the contents of which are incorporated herein by reference in their entirety.

BACKGROUND

Exemplary embodiments pertain to the art of vehicles and, more particularly, to a vehicle access control system and method.

In vehicles, such as manned and unmanned aircraft, access to the vehicle itself or to a vehicle controller may provide access to all available vehicle systems. For example, a key holder may have access to all control systems and security systems of the vehicle. The key holder, regardless of identity, may access any system and/or control even those beyond his/her level of authority. The use of a key reduces available options for restricting access to one or more vehicle systems. Military vehicle manufacturers would be receptive to improvements in vehicle access systems.

BRIEF DESCRIPTION

Disclosed is a vehicle access and control system includes an activation system, a vehicle control system, a communication system provided in the vehicle, a computer system mounted in the vehicle, and a vehicle access control system including a processor, a non-volatile memory, and a set of instructions stored on the non-volatile memory. The set of instructions, when executed by the processor, causing the processor to receive a user specific identification input, access a user profile associated with the user specific identification input, determine, from the user profile, system permissions associated with the user specific identification input, and manage access to one or more of the activation system, vehicle control system, communication system, and the computer system based on the system permissions.

Also disclosed is a method of accessing a vehicle including receiving, through a processor, a user specific identification input, accessing a non-volatile memory operatively connected to the processor, having stored thereon a user profile associated with the user specific identification input, determining, through the processor, system permissions associated with the user specific identification input stored in the user profile, and managing access to one or more of an activation system, a vehicle control system, a communication system provided in the vehicle, and a vehicle mounted computer system based on the system permissions.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
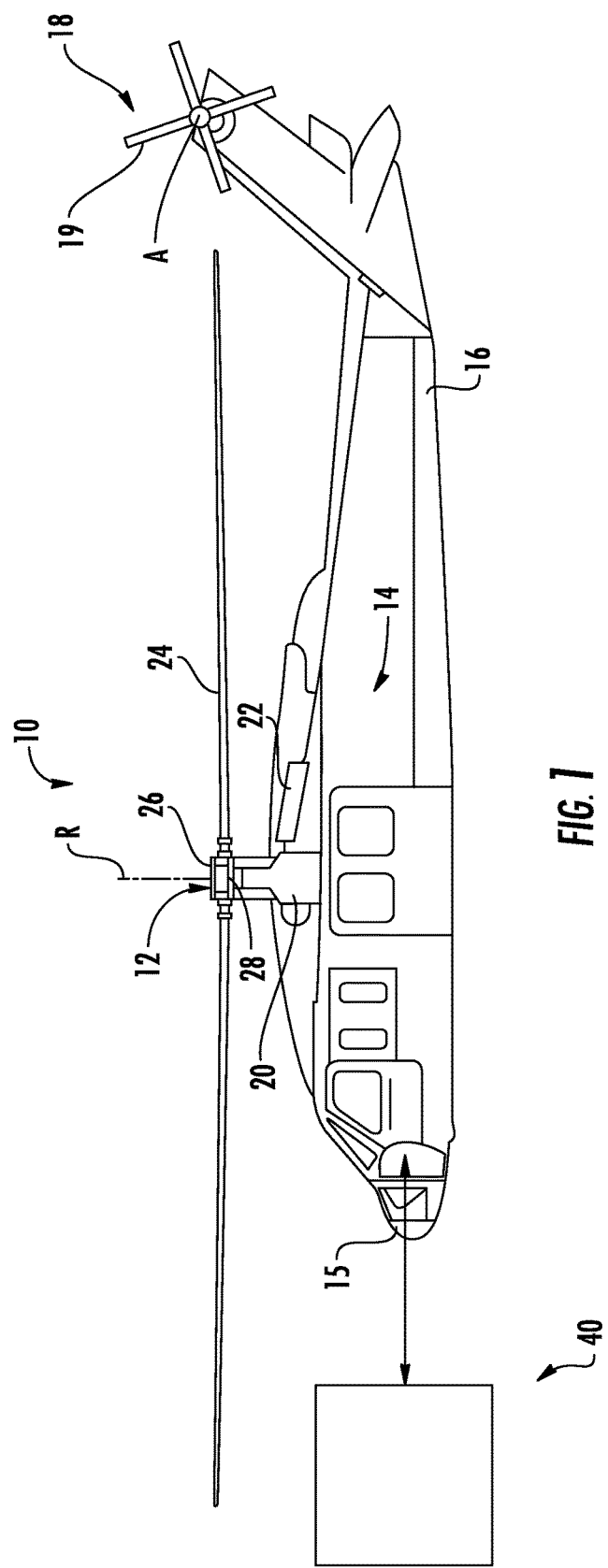
FIG. 1 depicts side view of a rotary wing aircraft including a vehicle access control system, in accordance with an exemplary embodiment.
Figure 2:
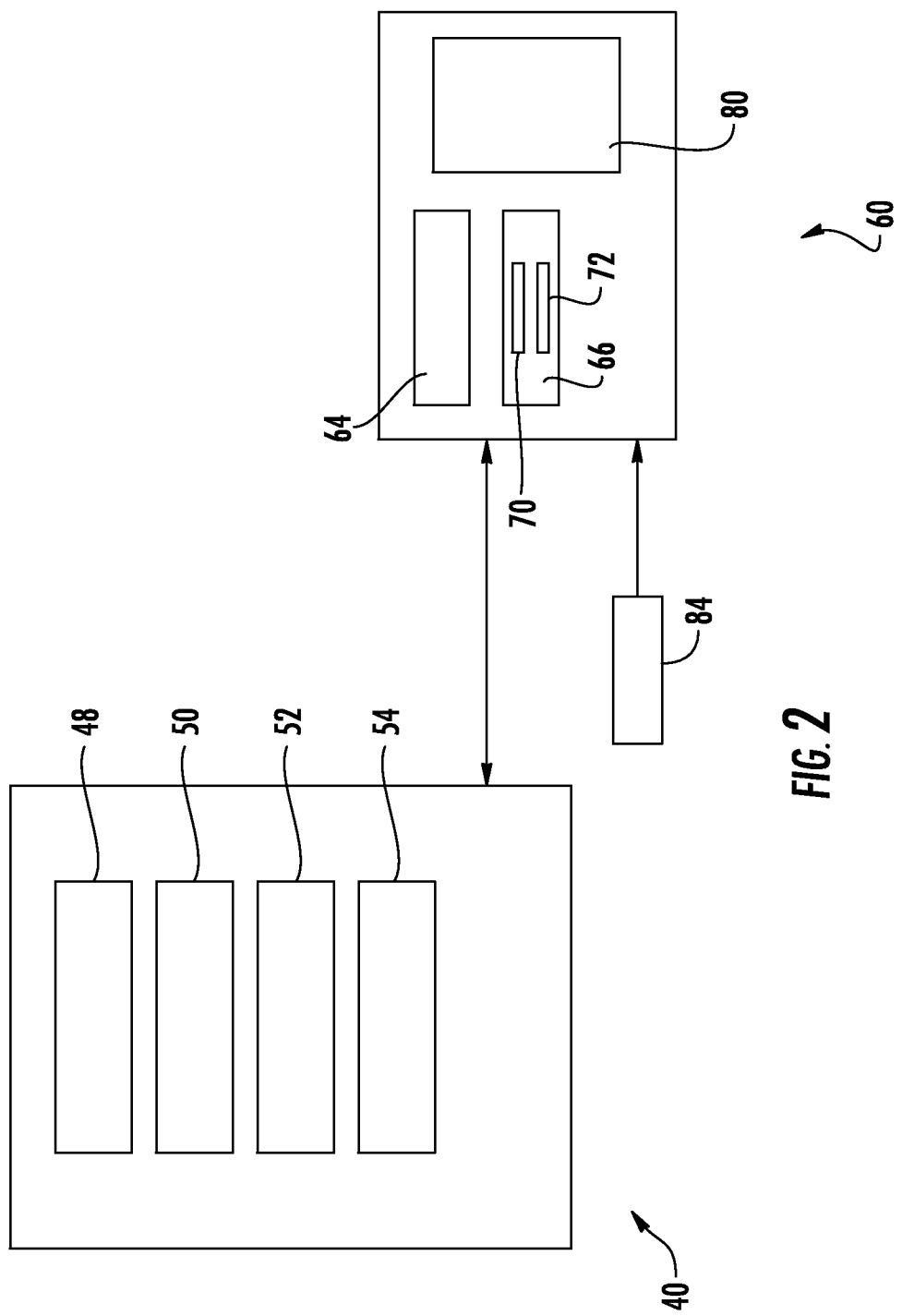
FIG. 2 is a block diagram depicting a vehicle access control system, in accordance with an exemplary embodiment, operatively connected to one or more control systems of the rotary wing aircraft of FIG. 1.

FIGS. 1 and 2 schematically illustrate a rotary wing aircraft 10 having a main rotor assembly 12. The aircraft 10 includes an airframe 14 having a nose 15 and an extending tail 16 which mounts a tail rotor assembly 18, such as an anti-torque system, a translational thrust system, a pusher propeller, a rotor propulsion system, and the like. Tail rotor system includes a plurality of tail rotor blades 19 that rotate about a tail rotor axis "A". The main rotor assembly 12 is driven about a main rotor axis R through a gearbox (illustrated schematically at 20) by one or more engines 22. Main rotor axis R is substantially perpendicular to tail rotor axis A. Main rotor assembly 12 includes a plurality of rotor blades, one of which is indicated at 24, mounted to a rotor hub 26.

A swashplate 28 provides control movements to rotor blades 24. More specifically, swashplate 28 is activated to affect a state or orientation of the rotor blades 24. Although a particular helicopter configuration is illustrated and described in the disclosed embodiment, other configurations and/or machines, such as high speed compound rotary wing aircraft with supplemental translational thrust systems, dual contra-rotating, or co-rotating coaxial rotor system aircraft, turbo-props, tilt-rotors and tilt-wing aircraft, as well as ground and sea vehicles may also benefit from the exemplary embodiments.

Rotary wing aircraft 10 includes a number of control systems 40. In accordance with an aspect of an exemplary embodiment illustrated in FIG. 2, control systems 40 could include an activation system 48 that facilitates activation of engines 22, a vehicle control system 50 that may include one or more inceptor devices (not shown), a communication system 52 and a computer system 54. Communication system 54 may constitute a one-way communication system or a two-way communication system. Computer system 54 may include weapons systems, navigation systems, sensor systems and the like.

In accordance with another aspect of an exemplary embodiment, rotary wing aircraft 10 also includes a vehicle access control system 60 operatively connected to control systems 40. Vehicle access control system 60 manages access to one or more of control systems 40 based on a user profile associated with a user specific identification as will be detailed below. Vehicle access control system 60 includes a processor 64 operatively connected to a non-volatile memory 66 having stored thereon computer readable instructions 70 and one or more user profiles 72. Vehicle access control system 60 may also include a profile management system 80 that accesses non-volatile memory 66 and user profiles 72 and a user specific identification (USID) input device 84. USID input device 84 may take on a variety of forms including, but not limited to, a keypad, an RFID reader, a magnetic strip reader, a biometric reader and the like. The biometric reader may include a fingerprint reader and/or a retina scanner. Further, USID input device 84 may include combinations of the aforementioned devices.

In accordance with an aspect of an exemplary embodiment, a user inputs a user specific ID into USID input device 84. Profile management system 80 verifies the user specific ID. Once verified, profile management system 80 accesses one of user profiles 72 associated with the user specific ID. Based on the one of user profiles 72, a determination may be made whether a second user ID is required before granting access to one or more of control systems 40. If a second ID is not required, or if required, the second ID is verified, vehicle access control system 60 provides access to one or more of control systems 40 based on system authorizations contained in the one of user profiles 72 associated with the user ID.

In this manner, vehicle access control system 60 enhances an overall operational and safety of the vehicle and/or data stored in the vehicle by managing access to various vehicle systems. Vehicle access control system 60 provides access to one or more of control systems 40 and, depending on the user profile, prohibits or blocks access to others of control systems 40. For example, a maintenance person may need access to activation system 48, but not require access to communication system 52. Further, vehicle access control system 60 may limit access to select frequencies for communication system 52. Vehicle access control system 60 may also restrict access to computer system 54 by the flight crew. The particular level of access and accessible systems will vary based on the user profile and the type of vehicle. Vehicle access control system 60 provides heightened security for vehicle, particularly military vehicles including aircraft, ground vehicles, and watercraft. Customizing access to vehicle systems not only enhances security but also reduces safety risks associated with unauthorized access. Additionally, it should be understood that, in addition to being provided in the vehicle itself, the vehicle access control system may be integrated into remote command and control systems such as those employed in unmanned vehicles. In this manner, levels of control of the unmanned vehicle may be restricted based on clearance levels, control authority and the like.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A vehicle access and control system comprising:
    an activation system;
    a vehicle control system;
    a communication system provided in the vehicle;
    a computer system mounted in the vehicle; and
    a vehicle access control system including a processor, a non-volatile memory, and a set of instructions stored on the non-volatile memory, the set of instructions, when executed by the processor, causing the processor to:
        receive at least two user specific identification inputs;
        access a user profile associated with the at least two user specific identification inputs;
        determine, from the user profile, system permissions associated with at least two user specific identification inputs; and
        manage access to one or more of the activation system, vehicle control system, communication system, and the computer system based on the system permissions.

2. The vehicle access and control system according to claim 1, wherein the at least two user specific identification inputs comprise at least two unrelated user specific identification inputs including at least two of a code, a biometric input, and an RFID input.

3. The vehicle access and control system according to claim 1, wherein the set of instructions, when executed by the processor, causes the processor to: disable one or more of the activation system, vehicle control system, communication system, and the computer system not listed in the user profile.

4. The vehicle access and control system according to claim 1, further comprising: a vehicle having a frame, and a least propulsion system supported in the frame and operatively connected to the activation system.

5. The vehicle access and control system according to claim 4, wherein the frame comprises an airframe and the propulsion system comprises one or more rotor assemblies.

6. The vehicle access and control system according to claim 1, wherein the vehicle access and control system is mounted in the vehicle.

7. A method of accessing a vehicle comprising:
    receiving, through a processor, at least two user specific identification inputs;
    accessing a non-volatile memory operatively connected to the processor, having stored thereon a user profile associated with the at least two user specific identification inputs;
    determining, through the processor, system permissions associated with the at least two user specific identification inputs stored in the user profile; and
    managing access to one or more of an activation system, a vehicle control system, a communication system provided in the vehicle, and a vehicle mounted computer system based on the system permissions.

8. The method of claim 7, wherein receiving, through the processor, the at least two user specific identification inputs includes receiving at least two unrelated user identification inputs including at least two of a code, a biometric input, and an RFID input.

9. The method of claim 7, further comprising: disabling one or more of the activation system, vehicle control system, communication system, and the computer system not listed in the user profile.

10. The method of claim 7, further comprising: wherein providing access to the activation system includes initiating operation of a propulsion system.

11. The method of claim 10, wherein initiating operation of the propulsion system includes activating one or more rotor assemblies.

12. The method according to claim 11, wherein activating the one or more rotor assemblies includes initiating operation of a rotary wing aircraft.

13. The method according to claim 7, wherein providing access to the communication system includes allowing access to only those communication frequencies listed in the user profile.

* * * * *